(12) United States Patent
Seol et al.

(10) Patent No.: US 12,031,665 B2
(45) Date of Patent: Jul. 9, 2024

(54) DISPLAY DEVICE AND DRIVING DEVICE FOR DISPLAY DEVICE

(71) Applicant: LG DISPLAY CO., LTD., Seoul (KR)

(72) Inventors: SeungWon Seol, Gyeonggi-do (KR); JongYoung Park, Gyeonggi-do (KR); Hyojin Jung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 319 days.

(21) Appl. No.: 17/537,094

(22) Filed: Nov. 29, 2021

(65) Prior Publication Data

US 2022/0178493 A1 Jun. 9, 2022

(30) Foreign Application Priority Data

Dec. 9, 2020 (KR) ........................ 10-2020-0171593

(51) Int. Cl.
*F16M 11/18* (2006.01)
*F16M 11/30* (2006.01)
*A47C 21/00* (2006.01)

(52) U.S. Cl.
CPC ............. *F16M 11/18* (2013.01); *F16M 11/30* (2013.01); *A47C 21/003* (2013.01)

(58) Field of Classification Search
CPC ....... F16M 11/18; F16M 11/30; A47C 21/003
USPC ............... 312/294, 319.1–319.8, 7.2, 312
See application file for complete search history.

(56) References Cited

U.S. PATENT DOCUMENTS

| | | | | |
|---|---|---|---|---|
| 3,415,586 A | * | 12/1968 | Hammond | A47B 51/00 108/147 |
| 5,096,275 A | * | 3/1992 | Pappas | A47B 88/42 312/312 |
| 5,129,611 A | * | 7/1992 | Grover | F16M 11/42 248/676 |
| 5,797,666 A | * | 8/1998 | Park | A47B 21/0073 312/223.3 |
| 6,612,670 B2 | * | 9/2003 | Liu | A47B 97/00 160/351 |
| 7,128,003 B2 | * | 10/2006 | Okninski | A47B 81/064 108/147 |
| 7,517,029 B2 | * | 4/2009 | Cvek | A47B 21/0073 312/196 |
| 8,051,782 B2 | * | 11/2011 | Nethken | A47B 21/02 108/50.01 |
| 8,678,523 B2 | * | 3/2014 | Carr | A47B 81/064 312/7.2 |

(Continued)

FOREIGN PATENT DOCUMENTS

| | | |
|---|---|---|
| CN | 205750647 U | 11/2016 |
| CN | 110390884 A | 10/2019 |

(Continued)

*Primary Examiner* — Daniel J Troy
*Assistant Examiner* — Timothy M Ayres
(74) *Attorney, Agent, or Firm* — Birch, Stewart, Kolasch & Birch, LLP

(57) ABSTRACT

A display device includes a display panel, a module housing accommodating the display panel and including a rear cover, a first moving plate connected to the display panel and positioned at a first side of the display panel, a second moving plate connected to the rear cover of the module housing and positioned at a second side of the display panel, a first driving member for pulling up and down the first moving plate, and a second driving member for pulling up and down the second moving plate.

19 Claims, 15 Drawing Sheets

(56) References Cited

U.S. PATENT DOCUMENTS

| | | | |
|---|---|---|---|
| 9,655,267 B2* | 5/2017 | Cope | G09F 9/35 |
| 10,582,622 B2 | 3/2020 | Kim et al. | |
| 10,586,475 B2 | 3/2020 | Park et al. | |
| 10,748,456 B2* | 8/2020 | Pyo | G09F 15/0062 |
| 10,768,662 B2 | 9/2020 | Tsai et al. | |
| 10,782,740 B2 | 9/2020 | Kim et al. | |
| 11,013,130 B2 | 5/2021 | Shin et al. | |
| 11,095,331 B2 | 8/2021 | Hwang et al. | |
| 11,157,039 B2 | 10/2021 | Kim et al. | |
| 11,193,624 B2* | 12/2021 | You | F16M 11/16 |
| 11,194,361 B1* | 12/2021 | Cho | G06F 3/147 |
| 11,527,188 B2* | 12/2022 | Seol | G09F 11/16 |
| 2006/0075550 A1* | 4/2006 | Hanson | A47C 21/003 5/2.1 |
| 2007/0019147 A1 | 1/2007 | Ryu | |
| 2007/0035671 A1* | 2/2007 | Ryu | H04N 5/64 348/794 |
| 2007/0108791 A1* | 5/2007 | Okninski | A47B 81/064 296/97.12 |
| 2008/0165481 A1 | 7/2008 | Kirschner et al. | |
| 2013/0257236 A1* | 10/2013 | Head | A47B 51/00 312/204 |
| 2015/0215692 A1 | 7/2015 | Yu | |
| 2017/0013726 A1 | 1/2017 | Han et al. | |
| 2019/0014902 A1 | 1/2019 | Choi et al. | |
| 2020/0208772 A1 | 7/2020 | Woo et al. | |

FOREIGN PATENT DOCUMENTS

| | | | |
|---|---|---|---|
| GB | 2 406 506 A | 4/2005 | |
| JP | 2008-533503 A | 8/2008 | |
| JP | 2020-87431 A | 6/2020 | |
| JP | 2020-144383 A | 9/2020 | |
| KR | 10-2007-0005964 A | 1/2007 | |
| KR | 10-0740258 B1 | 7/2007 | |
| KR | 20-2011-0000277 U | 1/2011 | |
| KR | 10-1573057 B1 | 11/2015 | |
| KR | 10-2018-0045980 A | 5/2018 | |
| KR | 10-2018-0135704 A | 12/2018 | |
| KR | 10-2019-0054429 A | 5/2019 | |
| KR | 10-2019-0092980 A | 8/2019 | |
| KR | 10-2020-0054062 A | 5/2020 | |
| KR | 10-2020-0082867 A | 7/2020 | |
| KR | 10-2020-0085531 A | 7/2020 | |
| KR | 10-2020-0114337 A | 10/2020 | |
| WO | WO2010/128193 A1 | 11/2010 | |

* cited by examiner

DISPLAY DEVICE AND DRIVING DEVICE FOR DISPLAY DEVICE

CROSS REFERENCE TO RELATED APPLICATIONS

This application claims the priority benefit of Korean Patent Application No. 10-2020-0171593, filed in the Republic of Korea on Dec. 9, 2020, which is hereby incorporated by reference in its entirety and for all purposes as if fully set forth herein.

BACKGROUND

Technical Field

Embodiments of the present disclosure relate to a display device.

Description of Related Art

In general, liquid crystal display (LCD) devices, plasma display devices, field emission display devices, and light emitting display devices are under active research in the field of flat display devices. Among them, the LCD devices and the light emitting display devices have attracted attention in view of their benefits of mass production, ease of driving means, and high image quality.

However, such display devices have gradually increased in volume (i.e., size) to meet the needs of users for a larger screen, thereby increasing risk of damage to the display panel and requiring a larger space for installation, which makes users difficult to secure the space.

In addition, in order to provide an always-on-display mode that continuously displays various information desired by the users of the display, an always-on-display device is required in addition to the general display device in a normal mode, which makes it difficult to satisfy various users demands.

Therefore, to solve the aforementioned problems and to provide a display device which provides more diverse uses to users, there is a need for research on providing a display device engaged with furniture, equipment, facilities, etc., to implement various forms of display.

SUMMARY OF THE DISCLOSURE

Embodiments of the present disclosure provide a display device allowing a user to freely accommodate a display panel in a housing so as not to be externally exposed, or to change display device between an always-on-display mode and a normal mode when the user desires.

Embodiments of the present disclosure also provide a display device configured to be mounted without being constrained by an additional mounting space, thereby using a space efficiently, and to reduce a risk of damage due to an external impact by minimizing the external exposure of the display panel, thereby satisfying various user demands.

The objectives of the embodiments of the present disclosure are not limited to what has been described above, and other unmentioned objectives will be clearly understood to those skilled in the art from the following description.

According to an aspect, embodiments of the present disclosure provide a display device including a module housing accommodating a display panel pulled up and down; a first moving plate accommodated in the module housing, wherein the first moving plate includes belt coupling portions on the opposite sides, the belt coupling portions are coupled to a first driving belt, and the first moving plate is pulled up and down with the display panel; a second moving plate accommodated in the module housing, wherein the second moving plate includes a front surface coupled to moving members pulled up and down with a second driving belt and a rear surface coupled to a rear cover of the module housing, and the second moving plate is pulled up and down with the rear cover; a first driving member pulling up and down the first moving plate and the display panel by winding or releasing the first driving belt; and a second driving member pulling up and down the second moving plate and the rear cover by winding or releasing the second driving belt.

According to an aspect, embodiments of the present disclosure provide a display device including a module housing accommodating display panel, a first moving plate pulled up and down with the display panel, a second moving plate pulled up and down with a rear cover of the module housing, a first driving member pull up and down the first moving plate and the display panel, a second driving member pull up and down the second moving plate and the rear cover.

According to embodiments of the present disclosure, the display device allows a user to freely accommodate a display panel in a housing so as not to be externally exposed, or to change display device between an always-on-display mode and the normal mode when the user needs.

According to embodiments of the present disclosure, the display device is configured to be mounted without being constrained by an additional mounting space, thereby using a space efficiently, and to reduce a risk of damage due to an external impact by minimizing the external exposure of the display panel, thereby satisfying various user demands.

DETAILED DESCRIPTION OF THE EMBODIMENTS

Figure 1:
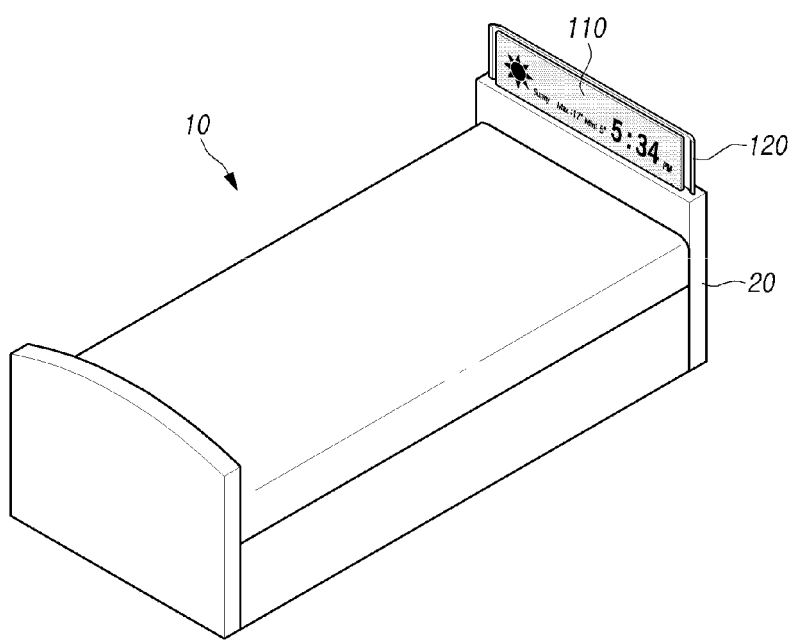
FIGS. 1 and 2 are schematic views illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including," "having," "containing,"

"constituting," "make up of," and "formed of" used herein are generally intended to allow other components to be added unless the terms are used with the term "only". As used herein, singular forms are intended to include plural forms unless the context clearly indicates otherwise.

Terms, such as "first," "second," "A," "B," "(A)," or "(B)" can be used herein to describe elements of the present disclosure. Each of these terms is not used to define essence, order, sequence, or number of elements, etc., but can be used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element can be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Figure 2:
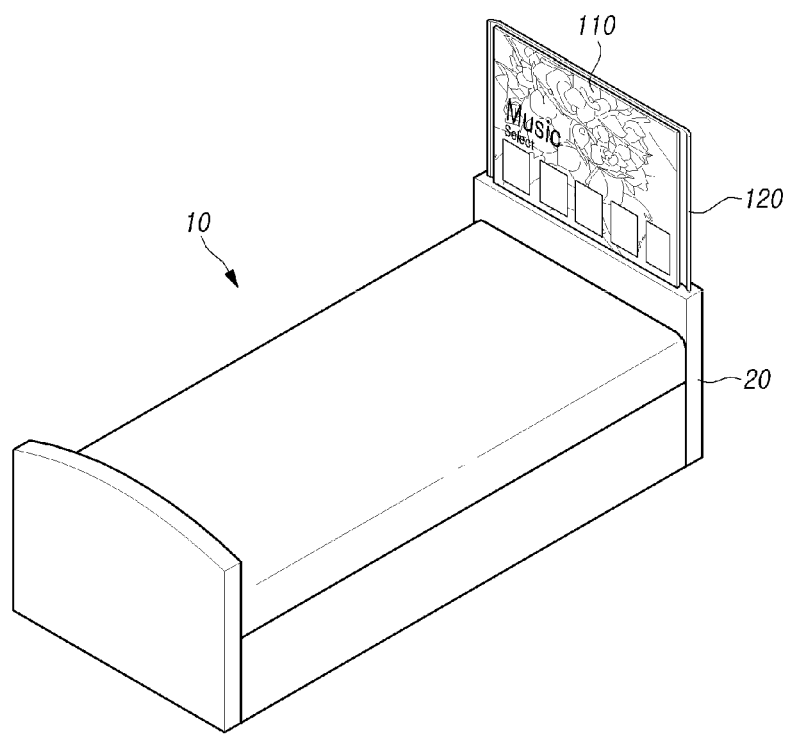
Figure 3:
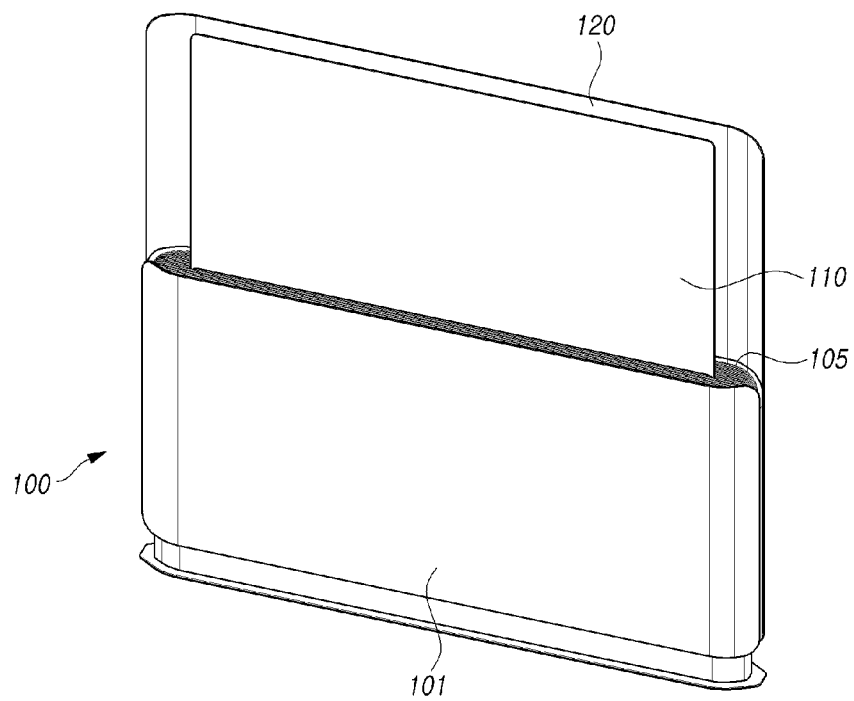
FIGS. 3 to 6 are perspective views illustrating a display device according to embodiments of the present disclosure.
Figure 4:
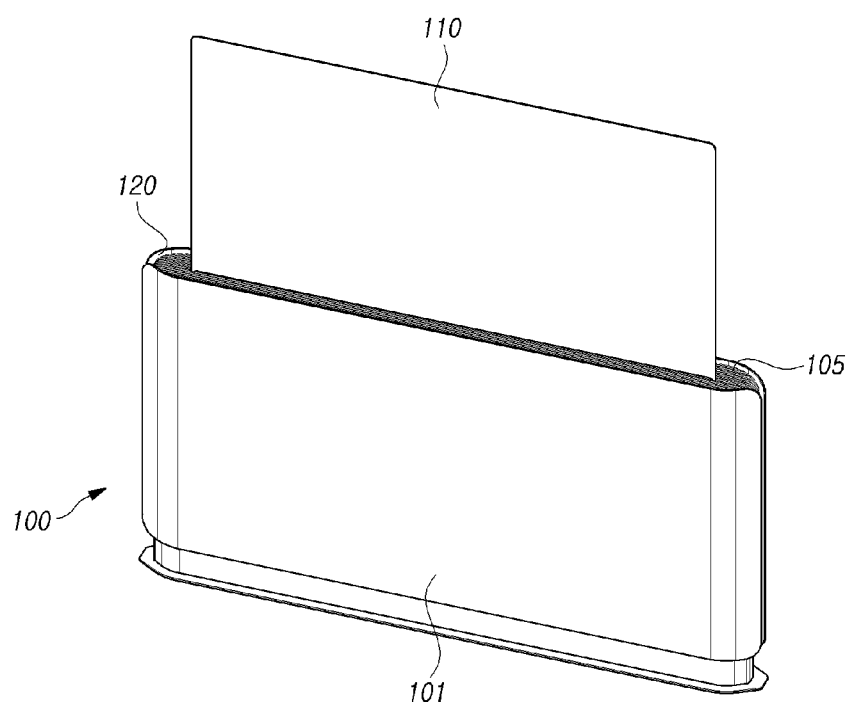
Figure 5:
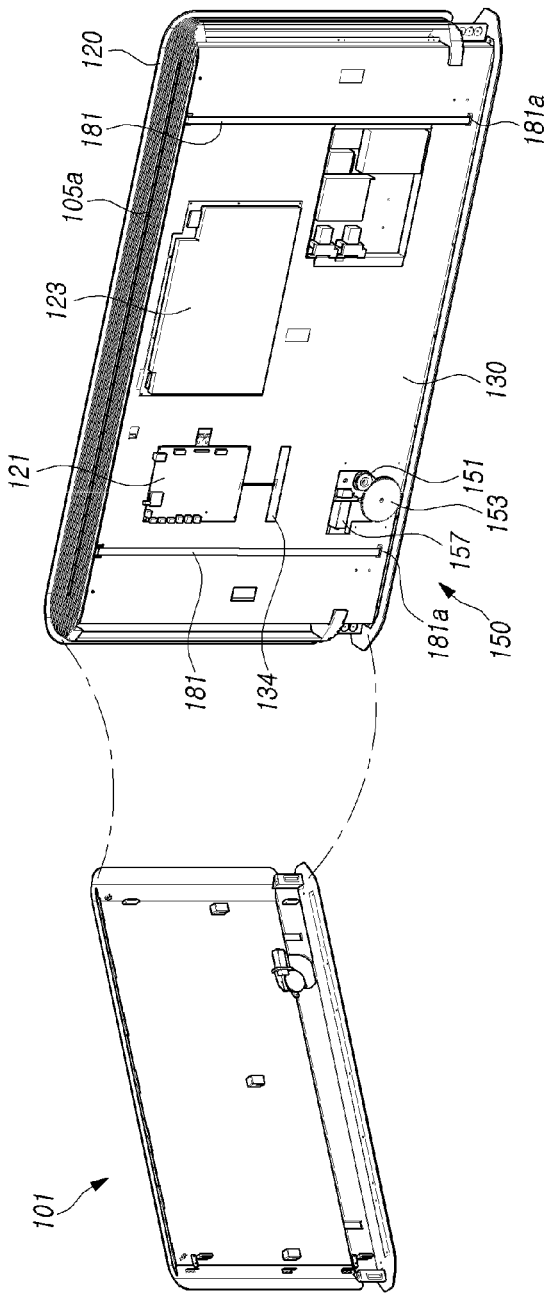
Figure 14:
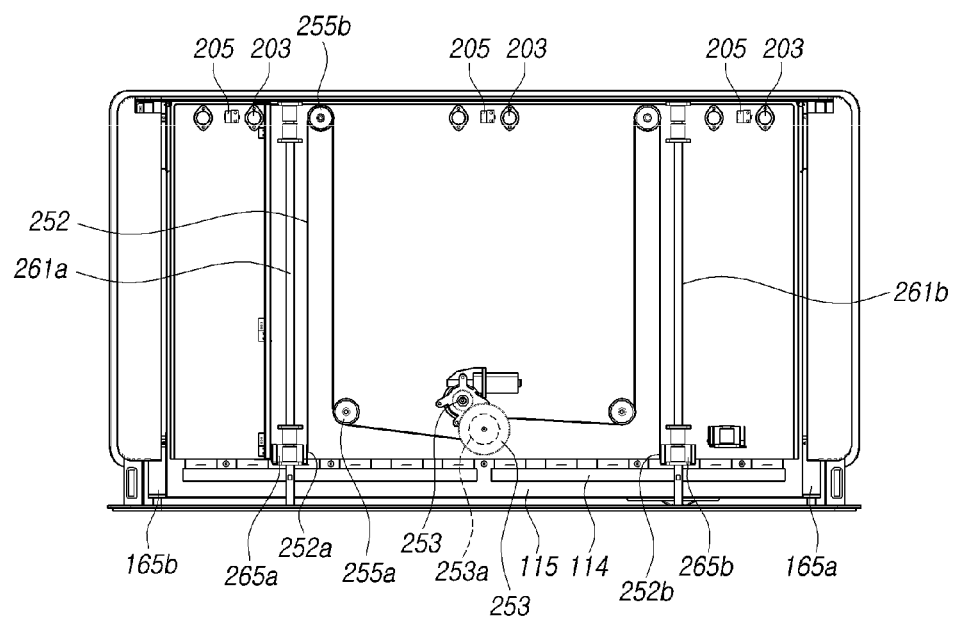
FIG. 14 is a rear view illustrating a display device according to embodiments of the present disclosure.
Figure 15:
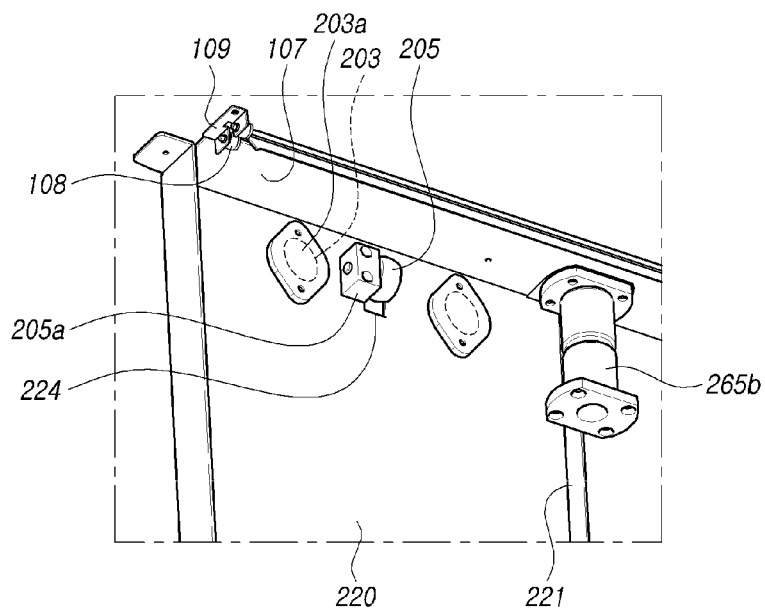
FIG. 15 is perspective views illustrating a display device according to embodiments of the present disclosure.

FIGS. 1 and 2 are schematic views illustrating a display device according to embodiments of the present disclosure. FIGS. 3 to 6 are perspective views illustrating a display device according to embodiments of the present disclosure. FIG. 7 is a front view illustrating a display device according to embodiments of the present disclosure. FIGS. 8 to 13 are perspective views illustrating a display device according to embodiments of the present disclosure. FIG. 14 is a rear view illustrating a display device according to embodiments of the present disclosure. FIG. 15 is perspective views illustrating a display device according to embodiments of the present disclosure. All the components of each display device according to all embodiments of the present disclosure are operatively coupled and configured.

Referring to FIGS. 1 to 15, a display device according to one or more embodiments of the present disclosure can include a module housing 100 accommodating display panel 110, a first moving plate 115 pulled up and down with the display panel 110, a second moving plate 210 pulled up and down with a rear cover 120 of the module housing 100, a first driving member 150 pulling up and down the first moving plate 115 and the display panel 110, and a second driving member 250 pulling up and down the second moving plate 210 and the rear cover 120. All the components of each display device according to all embodiments of the present disclosure are operatively coupled and configured.

Referring to FIGS. 1 to 15, a display device according to one or more embodiments of the present disclosure can include a module housing 100 accommodating a display panel 110 pulled up and down, a first moving plate 115 accommodated in the module housing 100, the first moving plate 115 includes belt coupling portions 117 on the opposite sides, the belt coupling portions 117 are coupled to a first driving belt 152, the first moving plate 115 is pulled up and down with the display panel 110, a second moving plate 210 accommodated in the module housing 100, the second moving plate 210 includes a front surface coupled to moving members 265a, 265b pulled up and down with a second driving belt 252 and a rear surface coupled to a rear cover 120 of the module housing 100, the second moving plate 210 is pulled up and down with the rear cover 120, a first driving member 150 pulling up and down the first moving plate 115 and the display panel 110 by winding or releasing the first driving belt 152, a second driving member 250 pulling up and down the second moving plate 210 and the rear cover 120 by winding or releasing the second driving belt 252.

The module housing 100 is built in and fixed inside of a main housing 10. The main housing 10 can be common furniture, equipment, facilities, etc.

Hereinafter, in the following description of embodiments of the present disclosure, the module housing 100 can be built in inside of a support portion 20, the support portion 20 can correspond to a leg, such as a leg of a bed, which is the most common furniture. The display panel 110 can display while the display panel 110 and the rear cover 120 are pulled up to the upper portion of the bed or pulled down from the upper portion of the bed.

In addition, a display device according to embodiments of the present disclosure can provide either of an always-on-display mode (AOD mode), that continuously displays information such as a clock, weather or news, and a normal mode that displays an image or video intended (i.e., selected) by a user.

As illustrated in FIG. 1, in usual time, most of the display panel 110 is covered inside the module housing 100 as only a portion of the display panel 110 is pulled up, and the always-on-display mode can be provided.

FIG. 1 is illustrated as the module housing 100 is installed by forming an empty space inside of the support portion 20 of the main housing 10 when the always-on-display mode is provided. For example, the module housing 100 can be provided inside of the support portion 20 of the main housing 10, when the always-on display mode is activated.

FIG. 2 is illustrated as the normal mode is provided with holding the display screen to the full size (i.e., fully extended position) when the display panel 110 is pulled up.

The module housing 100 has a rectangular shape and the module housing 100 accommodates the display panel 110, the first moving plate 115, the second moving plate 210, the first driving member 150, the second driving member 250, a first fixed plate 130 and a second fixed plate 220. The module housing 100 is partially omitted in the drawings for convenience of description.

A front cover 101, the first fixed plate 130, the first moving plate 115, the display panel 110, the second fixed plate 220, the second moving plate 201 and the rear cover 120 are sequentially stacked and accommodated with respect to the front surface of the module housing 100. For example, with respect to the display panel, the first fixed plate 130 is positioned on an opposite side of the display panel from the second fixed plate 220.

The display panel 110 is coupled to the rear surface of the first moving plate 115 and pulled up and down with the first moving plate 115. According to embodiments of the present disclosure, the display panel 110 can be either an LCD panel or a light emitting display panel, but is not limited thereto.

For example, when the display panel is an LCD panel, the display panel can further include a backlight unit (i.e., backlight) irradiating light onto the LCD panel, a lower polarization plate attached to a lower substrate, and an upper polarization plate attached to the front surface of an upper substrate. The specific configurations of the lower substrate and the upper substrate can vary according to driving modes of the LCD panel, for example, a twisted nematic (TN) mode, a vertical alignment (VA) mode, an in plane switching (IPS) mode, and a fringe field switching (FFS) mode.

Further, when the display panel is a light emitting display panel, the light emitting display panel can include a lower substrate with a plurality of light emitting cells formed in the areas each of which is defined by gate lines, data lines, and power (VDD) lines, and an upper substrate bonded to the lower substrate face to face. Drawings and a detailed description of the light emitting display panel are not provided herein.

As described above, the display panel is not limited to any particular type in embodiments of the present disclosure. For example, the display panel can be made up of a flexible substrate that is bendable, in embodiments of the present disclosure. The following description is given irrespective of display panel types.

The first moving plate 115 is coupled to the display panel 110 and the opposite sides of the first moving plate 115 have belt coupling portions 117 to which the first driving belt 152 is coupled. The first moving plate 115 moves along first guide bars 161*a*, 161*b*, to be described below, with the display panel 110, when the first driving belt 152 is wound or released by the first driving member 150.

In addition, a control printed circuit board 125, which is connected to a source printed circuit board 114 of the display panel 110 via a flexible circuit film, is fixed to the first moving plate 115. Thus, the control printed circuit board 125, which is connected to a main board 121 and a power board 123, to be described below, is stably fixed when the first moving plate 115 and the display panel 110 move.

The belt coupling portions 117 are provided at the opposite sides of the first moving plate 115 and are respectively fixed to a first end 152*a* and a second 152*b* of the first driving belt 152. Thus, the belt coupling portions 117 are pulled up and down with the first moving plate 115 by the first driving belt 152.

The first fixed plate 130 coupled to the module housing 100 and the first driving member 150 is provided between the front cover 101 and the first moving plate 115.

Each of elastic belts 181 includes a first end 181*b* fixed to the first moving plate 115 and a second end 181*a* fixed to the first fixed plate 130. Belt rollers 183 are fixed to the first fixed plate 130, and the elastic belts 181 are wound on (i.e., around) the belt rollers 183 and are rotatably supported by the belt rollers 183, respectively.

The elastic belts 181 are configured to provide a tensile force to the first moving plate 115 at the pulled down position. Thus, the driving force of a first driving motor 157 is assisted by the tensile force of the elastic belts 181 when the first moving plate 115 is pulled up.

Therefore, the elastic belts reduce a force required to pull up the first moving plate 11 and maintain the first moving plate 115 horizontally when the first moving plate 115 is pulled up and pulled down.

A main board 121 and a power board 123 are fixed to the first fixed plate 130 and are disposed in front of the first moving plate 115. An image processor electrically connected to the control printed circuit board 125 and supplying a data signal and a control signal to the display panel 110 is mounted on the main board 121. The power board 123 supplies power to the display panel 110.

A position sensor 134 coupled to the first fixed plate 130 senses and transmits the position of the display panel 110 to the main board 121. The main board 121 controls the display panel 110 to either of the always-on-display mode and normal mode according to the position of the display panel 110.

The position of the display panel 110, which determines the display panel 110 to the always-on-display mode can be set in advance. As illustrated in FIG. 1, embodiments of the present disclosure can be provided with the main board 121 that controls the display panel 110 to the always-on-display mode when the display panel 110 is pulled up to a preset position, including a preset position of the upper portion of the bed, by way of example.

A data cable 121*a* connects the main board 121 and the control printed circuit board 125, and a cable penetrating member 140 protects a power cable 123*a* connecting the power board 123 and the control printed circuit board 125.

A first end 140*a* of the cable penetrating member 140 is coupled to the first fixed plate and a second end 140*b* of the cable penetrating member 140 is coupled to a fixed flange 119 of the first moving plate 115. Thus, the second end 140*b* of the cable penetrating member 140 is pulled up and down with the first moving plate 115.

The cable penetrating member 140 includes a plurality of connecting members 145 rotatably connected to each other via hinge portions 145*h* and having empty space inside thereof. The data cable 121*a* and the power cable 123*a* penetrate the cable penetrating member 140 from the a first end to a second end. The cable penetrating member 140 maintains "U" shape which the lengths of both sides of the penetrating member 140 change when the first moving plate 115 is pulled up and down, thereby preventing the cable 121*a*, 123*a* from interference with surrounding electronic components while pulled up and down.

The first driving member 150, which pulls up and down the first moving plate 115, includes a first driving motor 157 coupled to the first fixed plate 130, a first driving gear 151 and a first driven gear 153 rotated by the first driving motor 157, a first driving pulley 153*a* coupled coaxially to the first driven gear 153 to wind or release the first driving belt 152, first driven pulleys 155*a*, 155*b* connected to the first driving pulley 153*a* by the first driving belt 152 and coupled to the first fixed plate 130.

The first driving motor 157 rotates the first driving pulley 153*a* with the number of revolutions reduced by the constant gear ratio between the first driving gear 151 and the first driven gear 153. The opposite ends of the first driving belt 152 are coupled to the first driving pulley 153 to be wound in the same direction.

Therefore, the first moving plate 115 and the display panel 110 are pulled up as the first driving belt 152 is wound, when the first driving pulley 153*a* rotates in one direction (e.g., a first direction), and the first moving plate 115 and the display panel 110 are pulled down as the first driving belt 152 is released when the first driving pulley 152*a* rotates in the opposite direction (e.g., a second direction).

Figure 6:
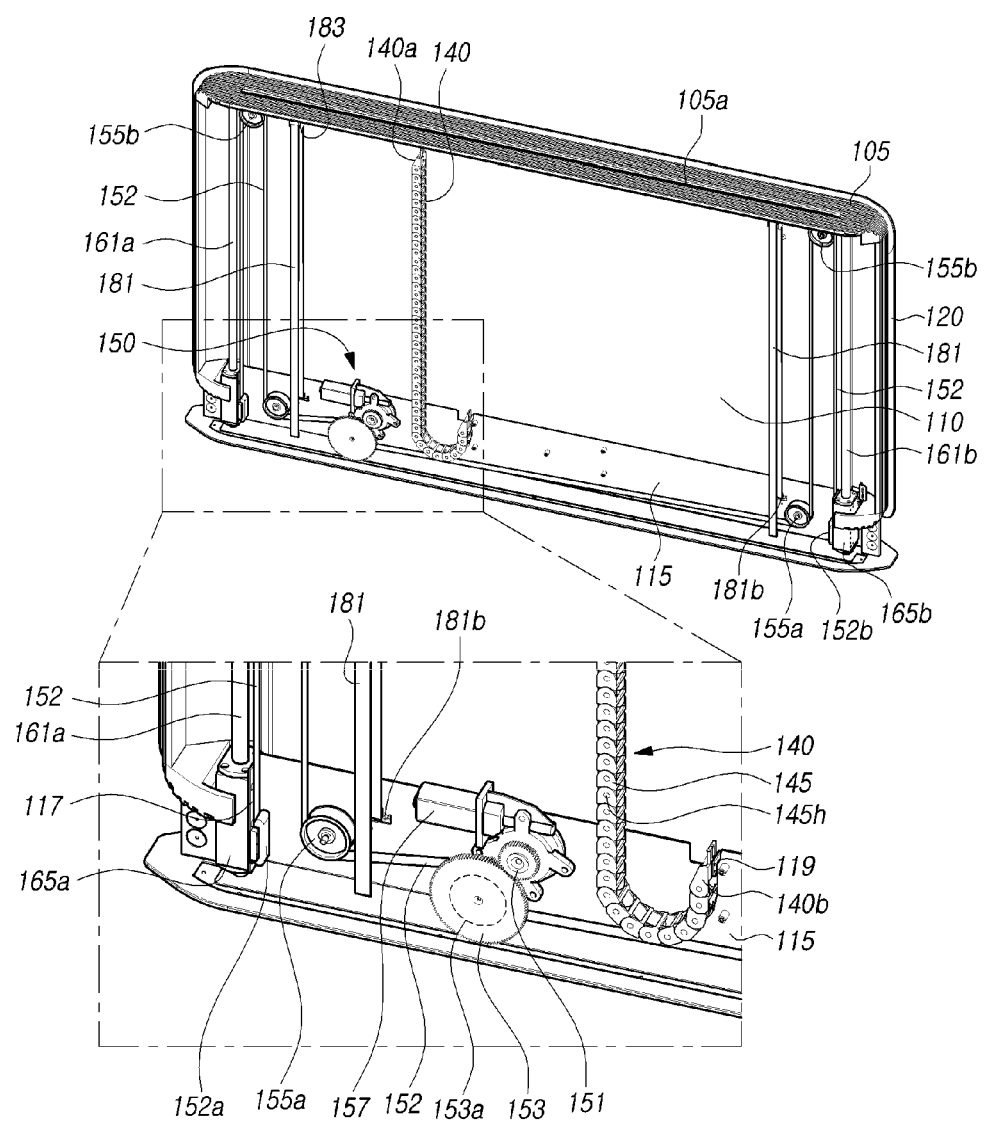
Figure 7:
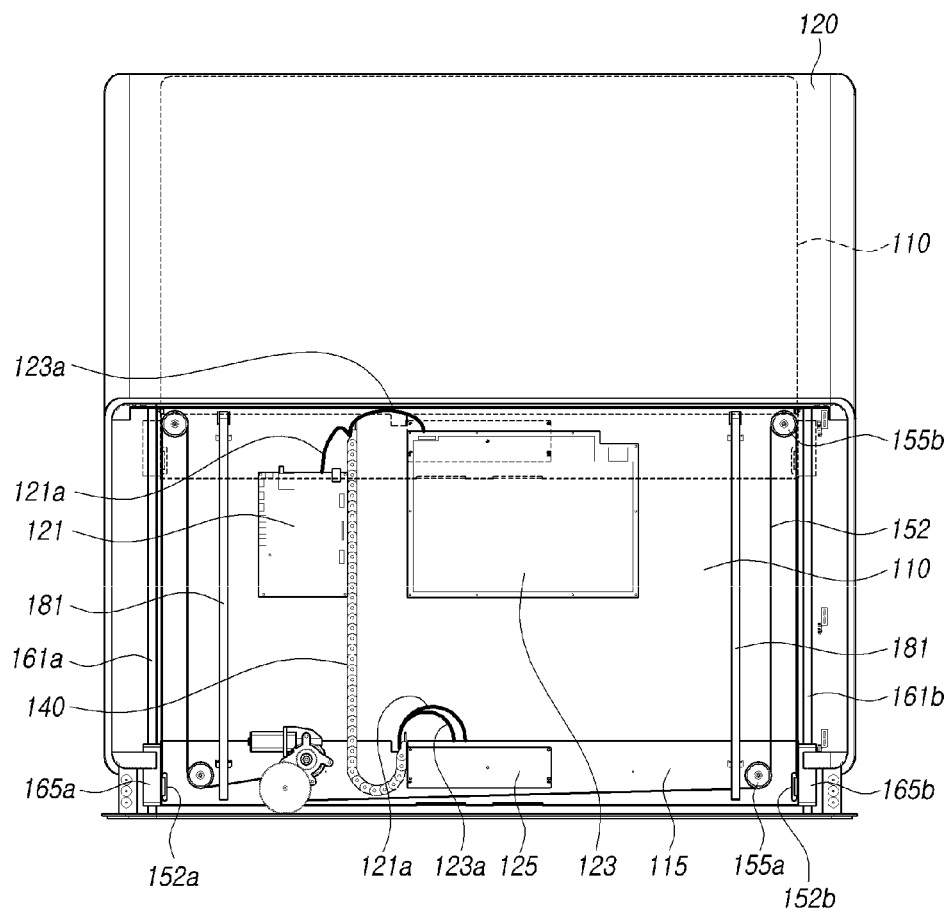
FIG. 7 is a front view illustrating a display device according to embodiments of the present disclosure.
Figure 8:
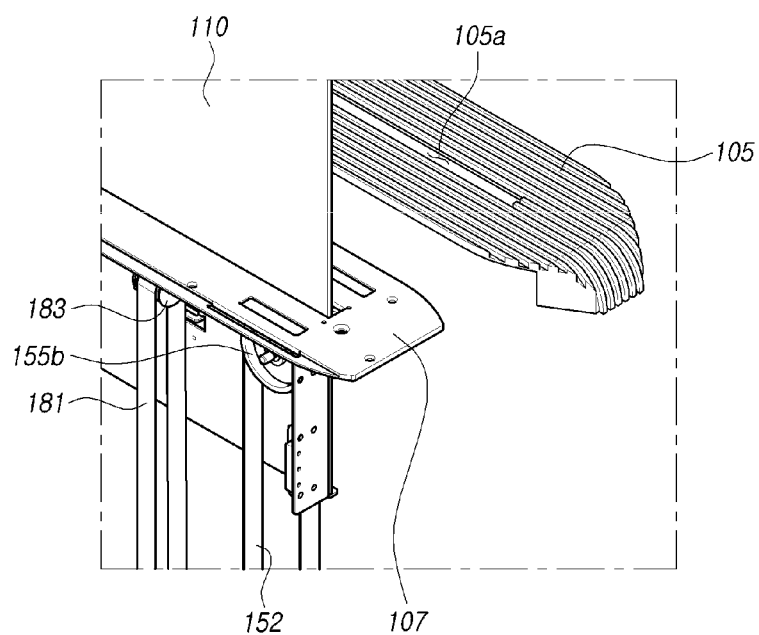
FIGS. 8 to 13 are perspective views illustrating a display device according to embodiments of the present disclosure.

As illustrated in FIG. 6, in which the front surface of the first moving plate 115 and the display panel 110 is illustrated, the first moving plate 115 and the display panel 110 are pulled up when the first driving pulley 153 rotates clockwise.

In addition, the first driving member 150 further includes first guides bars 161*a*, 161*b* respectively fixed to opposite ends of the module housing 100, and first moving guides 165a, 165b coupled to the belt coupling portions 117 of the first moving plate 115 and pulled up and down along the first guide bars 161a, 161b, respectively.

The first moving guides 165a, 165b coupled to the first moving plate 115 are pulled up and down along the first guide bars 161a, 161b. Thus, the first moving plate 115 is stably pulled up and down without being biased to either side while the driving force of the first driving motor 157 pulls up and down the first moving plate 115 via the first driving belt 152.

The first guide bars 161a, 161b and the first moving guides 165a, 165b are disposed at the opposite sides of the module housing 100 and the first moving plate 115 is guided by the first guide bars 161a, 161b and the first moving guides 165a, 165b when pulled up and down. FIG. 6 illustrates the first moving plate 115 that is in the pulled down position, and FIG. 7 illustrates the first moving plate 115 that is in the pulled up position, the first moving plate 115 being illustrated with dotted lines.

An upper cover 105 having an entry/exit hole 105a which the display panel 110 passes is coupled to the upper portion of the module housing 100. The user can stow the display panel 110 is as to not be exposed or can use the display panel 110 to always-on-display mode.

The display panel 110 can be pulled down under of the upper cover 105 not to be exposed. Thus, the display panel 110 is protected from external impact and occupies minimized space.

Figure 9:
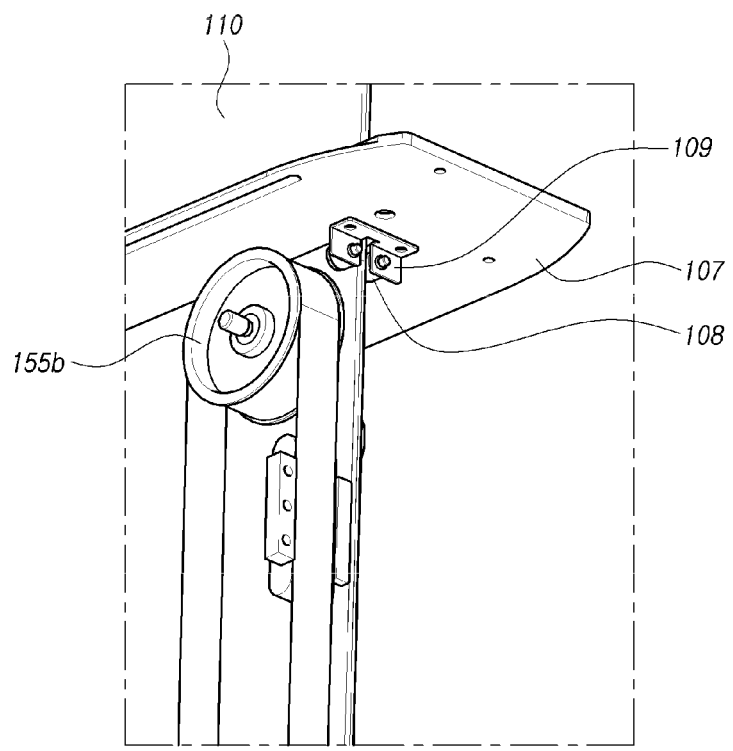
Figure 10:
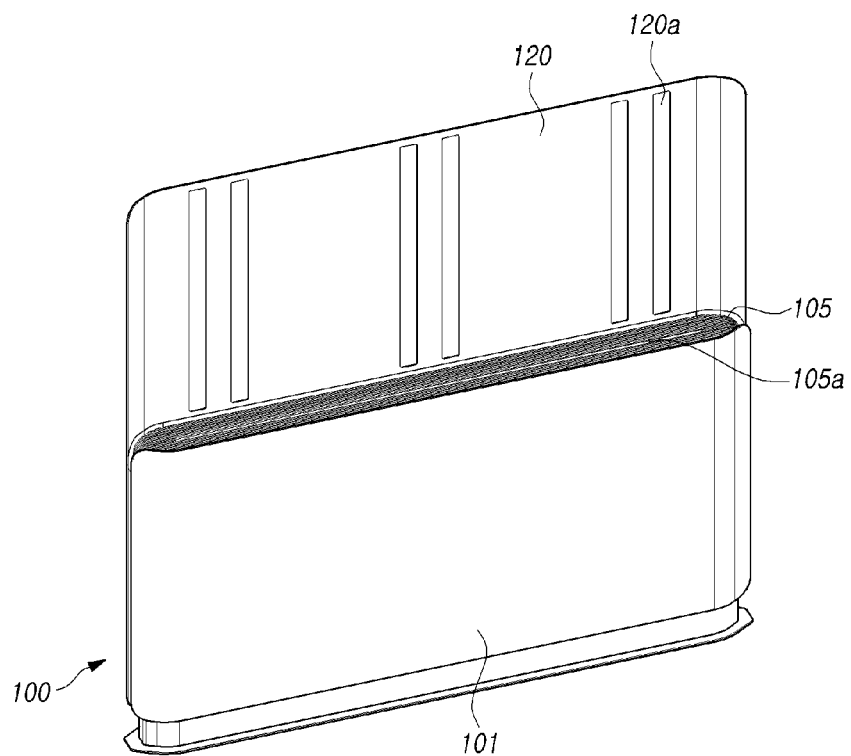
Figure 11:
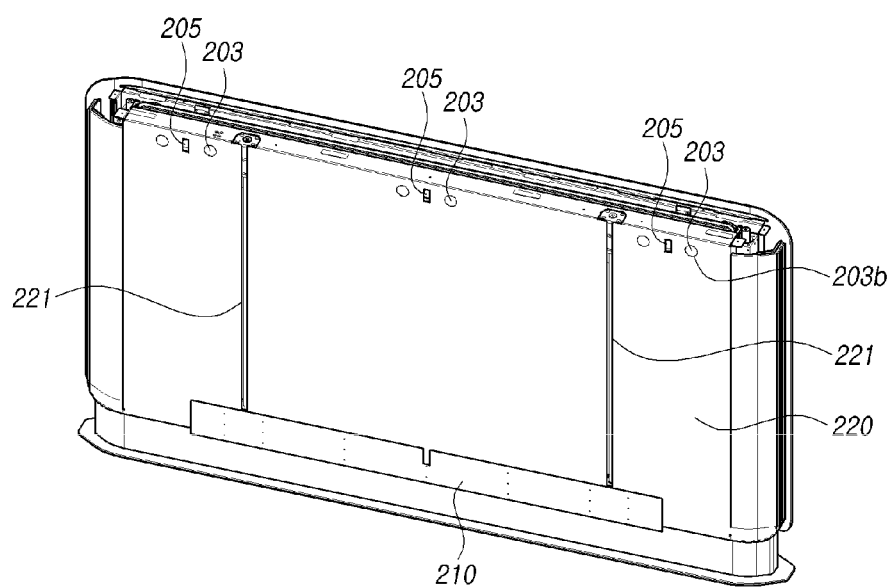
Figure 12:
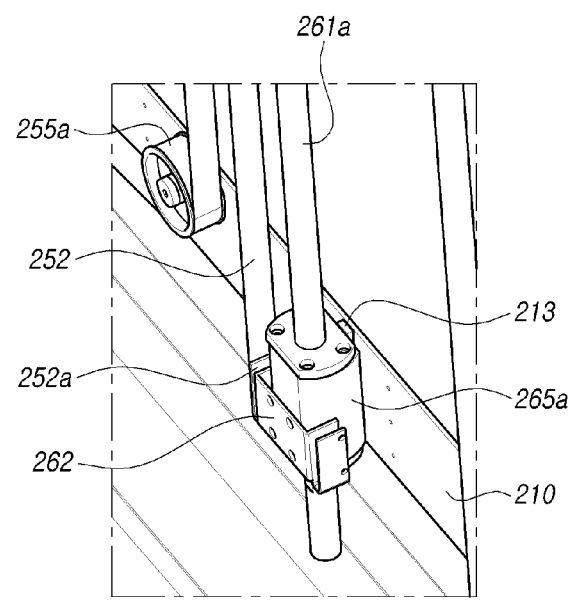
Figure 13:
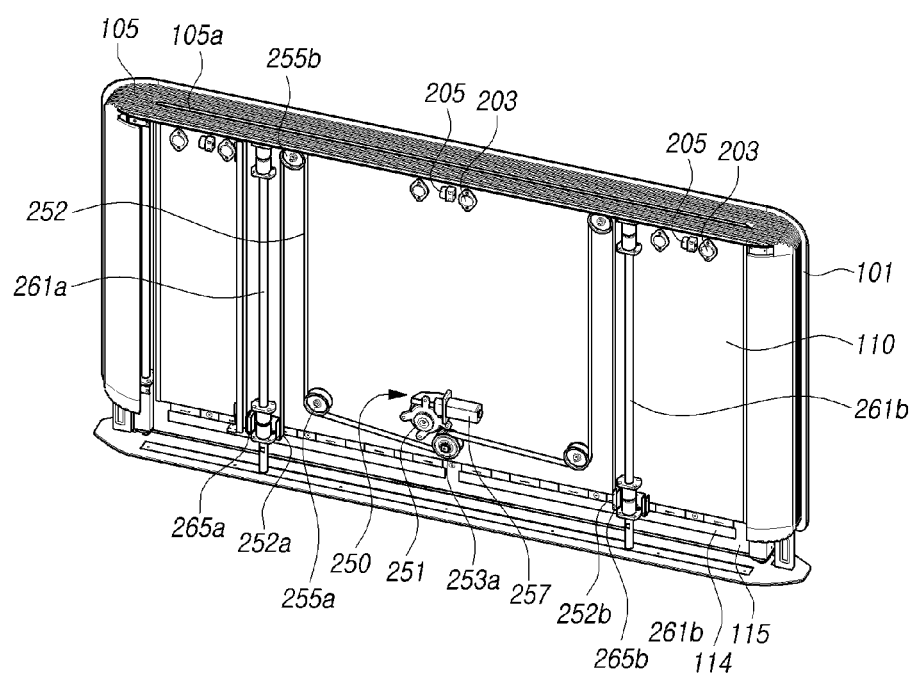

In addition, a cover plate 107 coupled to the module housing 100 is provided under the upper cover 105. A support roller 108 supporting the front and rear surface of the display panel 110 is coupled to the cover plate 107. The support roller 108 can be provided as a pair, including a first support roller 108 provided at the front surface of the display panel 110, and a second support roller provided at the rear surface of the display panel, as shown in FIG. 9.

The support roller 108 is provided as a couple of rollers supporting the front and rear surface of the display panel 110, respectively, and rotatably coupled to a fixed bracket 109 coupled to the cover plate 107.

Therefore, the support roller 108 rolls when the display panel 110 is pulled up and down, and supports the display panel 110, so as to avoid or prohibit shaking of the display panel 110. Especially, the pulled up display panel 110 is stably supported by the support roller 108.

A second fixed plate 220 coupled to the module housing 100 and the second driving member 250 is provided between the rear cover 120 and the display panel 110.

The rear cover 120 can be pulled up and down with the distance equal to the pulled up and down distance of the display panel 110, or can be pulled up and down with the separate distance which the user intended, by the second driving member 250.

The second fixed plate 220 includes guide holes 221 to guide the second moving plate 210 pulled up and down. The guide holes 221 can be spaced apart from one another and provided at opposing sides of the second fixed plate 220. The front surface of the second moving plate 210 includes guide protrusions 213 inserted into the guide holes 221, respectively.

Therefore, the second moving plate 210 is stably pulled up and down with the rear cover 120 without being biased to either side.

The guide protrusions 213 of the second moving plate 210 inserted into the guide holes 221 are coupled to the moving members 265a, 265b disposed on the front surface of the second fixed plate 220, respectively. The guide protrusions 213 are pulled up and down with the moving members 265a, 265b. Thus, the rear cover 120 is stably pulled up and down while supported to the guide holes 221 with the second moving plate 210 and the moving members 265a, 265b.

The guide holes 221 can be symmetrically disposed at the opposite sides respect to the center of the second moving plate 210 and the guide protrusions 213 provided as a pair at the second moving plate 210 and positioned according to the guide holes 221 are illustrated, by way of example. Three or more of the guide holes 221 and the guide protrusions 213 can be provided, respectively, to stably pull up and down the rear cover 120 even more.

The second driving member 250, which pulls up and down the second moving plate 210, includes a second driving motor 257 coupled to the second fixed plate 220, a second driving gear 251 and a second driven gear 253 rotated by the second driving motor 257, a second driving pulley 253a coupled coaxially to the second driven gear 253 to wind or release the second driving belt 252, second driven pulleys 255a, 255b connected to the second driving pulley 253a by the second driving belt 252 and coupled to the second fixed plate 220. The opposite ends 252a, 252b of the second driving belt 252 are coupled to the bracket 262 provided on the moving members 265a, 265b, and the moving members 265a, 265b are pulled up and down as the second driving belt 252 is wound or released.

The second driving motor 257 rotates the second driving pulley 253a with the number of revolutions reduced by the constant gear ratio between the second driving gear 251 and the second driven gear 253. The opposite ends of the second driving belt 252 are coupled to the second driving pulley 253a to be wound in the same direction.

Therefore, the second moving plate 210 and the rear cover 120 are pulled up as the second driving belt 252 is wound, when the second driving pulley 253a rotates in one direction (e.g., a first direction), and the second moving plate 210 and the rear cover 120 are pulled down as the second driving belt 252 is released, when the second driving pulley 253a rotates in the opposite direction (e.g., a second direction).

In addition, the second driving member 250 further includes second guide bars 261a, 261b including opposites ends fixed to the module housing 100. The moving members 265a, 265b are coupled to the second moving plate 210 and are pulled up and down along the second guide bars 261a, 261b, respectively.

The moving members 265a, 265b coupled to the second moving plate 210 are pulled up and down along the second guide bars 261a, 261b. Thus, the second moving plate 210 is stably pulled up and down without being biased to either side while the driving force of the second driving motor 257 pulls up and down the second moving plate 210 via the second driving belt 252.

The second guide bars 261a, 261b are disposed at the opposite sides of the module housing 100 and guide the second moving plate 210 to be pulled up and pulled down.

The rear cover 120 includes magnet plates 120a disposed along the direction of pulling up and down. The upper portion of the second fixed plate 220 includes magnets 203 correspondingly positioned to the magnet plates 120a.

The magnet plates 120a are disposed at the center portion and the opposite sides, which are symmetric, in the direction of pulling up and down, thereby enhancing the rigidity of the rear cover 120 and preventing the rear cover 120 from shaking.

The magnet plates 120a and the magnets are configured to attract each other, and the rear cover 120 is supported by the attracting magnet force while pulled up and down. Especially, the supporting force becomes larger when the rear cover is partially pulled up not wholly, like the always-on-display mode.

The upper portion of the second fixed plate 220 includes cover support rollers 205 supporting the front surface of the rear cover 120 when the rear cover 120 is pulled up and down. The cover support roller 205 rolls when the rear cover 120 is pulled up and down and supports the rear cover 120 not to be shaken, especially not to be inclined toward the display panel 110 at the upper portion of the second fixed plate 220.

As illustrated in FIG. 15, cut-out holes 224 are provided at the upper portion of the second fixed plate 220, nearby the magnets 203, to stably couple the cover support rollers 205. The cover support rollers 205 are inserted into the cut-out holes 224 and are coupled to the upper portion of the second fixed plate 220 via a bracket 205a.

The magnets are exposed in the front direction of the rear cover 120 through the magnet holes 203b, and are coupled to the rear surface of the second fixed plate 220 via magnet holders 203a.

Therefore, the cover support rollers 205 support the rear cover 120 at a portion which the attracting force between the rear cover 120 and the magnets 203 is strongest, thereby supporting the rear cover 120 not to be biased either in front or in rear (i.e., in the front or rear directions).

As described above, according to embodiments of the present disclosure, a display device allowing a user to freely accommodate a display panel in a housing so as not to be externally exposed, or to change display device between an always-on-display mode and the normal mode when the user needs.

Further, according to embodiments of the present disclosure, a display device configured to be mounted without being constrained by an additional mounting space, thereby using a space efficiently, and to reduce a risk of damage due to an external impact by minimizing the external exposure of the display panel, thereby satisfying various user demands.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
   a display panel;
   a first driving belt;
   a second driving belt;
   a module housing accommodating the display panel and including a rear cover;
   a first moving plate accommodated in the module housing and including belt coupling portions on opposite sides of the module housing, the belt coupling portions being coupled to the first driving belt;
   a second moving plate accommodated in the module housing and including a front surface coupled to moving members and a rear surface coupled to the rear cover of the module housing, the moving members being coupled to the second driving belt;
   a first driving member configured to pull up and pull down the first moving plate and the display panel by winding or releasing the first driving belt;
   a second driving member configured to pull up and pull down the second moving plate and the rear cover by winding or releasing the second driving belt;
   a cover plate coupled to the module housing; and
   a pair of support rollers supporting a front surface and a rear surface of the display panel, respectively, the pair of support rollers being coupled to the cover plate.

2. The display device according to claim 1, further comprising a control printed circuit board fixed to the first moving plate,
   wherein the display panel includes a source printed circuit board, and
   wherein the control printed circuit board is connected to the source printed circuit board of the display panel via a flexible circuit film.

3. The display device according to claim 2, further comprising:
   a first fixed plate coupled to the module housing and the first driving member, and provided between a front cover of the module housing and the first moving plate.

4. The display device according to claim 3, wherein the display device further comprises:
   at least one elastic belt; and
   at least one belt roller fixed to the first fixed plate,
   wherein the at least one elastic belt includes a first end fixed to the first moving plate and a second end, opposite to the first end, fixed to the first fixed plate, and
   wherein the at least one elastic belt is wound on the at least one belt roller and is rotatably supported by the at least one belt roller.

5. The display device according to claim 3, further comprising:
   a main board fixed to the first fixed plate;
   a power board fixed to the first fixed plate and configured to supply power to the display panel; and
   an image processor electrically mounted on the main board and connected to the control printed circuit board, the image processor being configured to supply a data signal and a control signal.

6. The display device according to claim 5, further comprising:
   a position sensor coupled to the first fixed plate, the position sensor being configured to sense a position of the display panel and transmit the position of the display panel to the main board,
   wherein the main board is configured to control the display panel to an always-on-display mode in response to the display panel being moved to a preset position.

7. The display device according to claim 5, wherein the display device further comprises:
   a data cable connecting the main board and the control printed circuit board;
   a power cable connecting the power board and the control printed circuit board; and a cable penetrating member including a first end coupled to the first fixed plate and a second end coupled to the first moving plate, and wherein the data cable and the power cable are mounted inside the cable penetrating member.

8. The display device according to claim 3, wherein the first driving member comprises:
   a first driving motor coupled to the first fixed plate;
   a first driving gear driven by the first driving motor;
   a first driven gear engaged with the first driving gear and rotated by the first driving gear;
   a first driving pulley coupled coaxially to the first driven gear and configured to wind or release the first driving belt; and
   first driven pulleys connected to the first driving pulley by the first driving belt and coupled to the first fixed plate.

9. The display device according to claim 8, wherein the first driving member further comprises:
   a pair of first guide bars fixed to the module housing, the pair of first guide bars being spaced apart from one another; and
   a pair of first moving guides coupled the first moving plate and configured to be pulled up and pulled down along the pair of first guide bars, respectively.

10. The display device according to claim 9, wherein the pair of first moving guides is coupled to the belt coupling portions, and
    wherein winding or releasing of the first driving belt by the first driving member pulls up or pulls down the pair of first moving guides and the first moving plate, to pull up or pull down the display panel.

11. The display device according to claim 1, further comprising: a second fixed plate coupled to the module housing and positioned opposite to the first fixed plate with respect to the display panel,
    wherein the second driving member is provided between the rear cover of the module housing and the display panel.

12. The display device according to claim 11, wherein the second fixed plate includes guide holes, each guide hole extending along a vertical axis of the display device,
    wherein the second moving plate includes guide protrusions inserted into the guide holes, respectively, and
    wherein the guide holes guide the second moving plate along the vertical axis of the display device.

13. The display device according to claim 12, wherein the moving members are disposed on a front surface of the second fixed plate, and
    wherein the guide protrusions of the second moving plate are coupled to the moving members, respectively, and are pulled up and pulled down with the moving members.

14. The display device according to claim 13, wherein the second driving member comprises:
    a second driving motor coupled to the second fixed plate;
    a second driving gear driven by the second driving motor;
    a second driven gear engaged with the second driving gear and rotated by the second driving gear;
    a second driving pulley coupled coaxially to the second driven gear and configured to wind or release the second driving belt; and
    second driven pulleys connected to the second driving pulley by the second driving belt and coupled to the second fixed plate.

15. The display device according to claim 14, wherein the second driving member pair of second further comprises: a guide bars fixed to the module housing, the pair of second guide bars being spaced apart from one another, and
    wherein the moving members are coupled to the second moving plate and are pulled up and pulled down along the second guide bars, respectively.

16. The display device according to claim 11, wherein the rear cover includes magnet plates disposed along a vertical direction of the display device, and
    wherein an upper portion of the second fixed plate includes magnets positioned at locations correspondingly to the magnet plates, respectively.

17. The display device according to claim 16, wherein the upper portion of the second fixed plate further includes cover support rollers configured to roll against a front surface of the rear cover when the rear cover is pulled up and pulled down to support the rear cover.

18. The display device according to claim 1, wherein the module housing is fixed inside of a main housing, and
    wherein the display panel and the rear cover are pulled up to the upper portion of the main housing or pulled down from the upper portion of the main housing.

19. A driving device for a display device, the driving device comprising:
    a module housing including a rear cover and configured to accommodate a display panel;
    a first moving plate connected to the display panel and configured to be positioned at a first side of the display panel;
    a second moving plate connected to the rear cover of the module housing and configured to be positioned at a second side of the display panel, opposite to the first side;
    a first driving member configured to pull up and pull down the first moving plate;
    a second driving member configured to pull up and pull down the second moving plate;
    a cover plate coupled to the module housing; and
    a pair of support rollers supporting a front surface and a rear surface of the display panel, respectively, the pair of support rollers being coupled to the cover plate.

* * * * *